United States Patent [19]

Vanderbilt et al.

[11] Patent Number: 5,070,122

[45] Date of Patent: Dec. 3, 1991

[54] ENVIRONMENTALLY DEGRADABLE POLYMER BLENDS

[75] Inventors: Jeffrey J. Vanderbilt; Charles M. Neeley, both of Longview, Tex.

[73] Assignee: Eastman Kodak Company, Rochester, N.Y.

[21] Appl. No.: 366,825

[22] Filed: Jun. 15, 1989

[51] Int. Cl.$^5$ ............................ C08L 3/00; C08L 3/02; C08L 5/02

[52] U.S. Cl. ........................................ 524/47; 524/48; 524/53; 524/54; 524/55

[58] Field of Search ..................... 524/47, 48, 53, 54, 524/55

[56] References Cited

U.S. PATENT DOCUMENTS

| | | | |
|---|---|---|---|
| 4,016,117 | 4/1977 | Griffin | 527/312 |
| 4,021,388 | 5/1977 | Griffin | 527/312 |
| 4,133,784 | 1/1979 | Otey et al. | 527/312 |
| 4,338,227 | 7/1982 | Ballard | 524/523 |

FOREIGN PATENT DOCUMENTS

| | | |
|---|---|---|
| 504785 | 10/1979 | Australia . |
| WO88/09354 | 12/1988 | European Pat. Off. . |
| 1918562 | 10/1969 | Fed. Rep. of Germany . |
| 1128793 | 10/1968 | United Kingdom . |
| 2029836 | 3/1980 | United Kingdom . |

OTHER PUBLICATIONS

Guillet, "Polymers with Controlled Lifetimes," in Polymer Science and Technology, vol. 3, pp. 1–25 (Plenum Press, 1973).

Potts, "Plastics, Environmentally Degradable," in Encyclopedia of Chemical Technology, Third Edition, Supplement, pp. 626–668.

ASTM Test Method G21–70 (reapproved 1985).

EPA Report No. EPA-R2-72-046, "An Investigation of the Biodegradability of Packing Plastics," prepared for the Environmental Protection Agency by Union Carbide Corp., Aug., 1972.

*Primary Examiner*—Nathan M. Nutter
*Attorney, Agent, or Firm*—John F. Stevens; William P. Heath, Jr.

[57] ABSTRACT

Environmentally degradable blends comprising ethylene-carbon monoxide copolymers, polysaccharide, and optionally, unsaturated oil are disclosed. The invention polymer blends are both photodegradable and biodegradable.

24 Claims, No Drawings

ENVIRONMENTALLY DEGRADABLE POLYMER BLENDS

DESCRIPTION

This invention relates to novel blends of polymeric components which are readily degradable upon extended exposure to normal environmental conditions. In one aspect, the present invention relates to methods for improving the degradability of such polymeric materials as ethylene-carbon monoxide copolymers.

BACKGROUND

Polymeric materials have found widespread use in a variety of applications. The environmental degradability of such polymeric materials has recently become a worldwide issue, primarily because of concerns of limited landfill space and the accumulation of unsightly litter.

It is desirable to reduce the amount of litter which must be disposed of so as to minimize the problem of landfill space being consumed and to increase the environmental degradability of such materials to minimize the accumulation of unsightly litter.

STATEMENT OF THE INVENTION

In accordance with the present invention, there have been discovered novel polymer blends which are both biodegradable, i.e., susceptible to loss of structural integrity by the action of living organisms (e.g., fungi, bacteria), and photodegradable, i.e., susceptible to loss of structural integrity by the action of sunlight or artificial light.

In accordance with a particular embodiment of the present invention, there are provided methods for enhancing the environmental degradability, i.e., the loss of structural integrity resulting from the action of the total environment, e.g., rain, wind, sunlight, insects, animals, microorganisms, and the like, of ethylene-carbon monoxide copolymers.

DETAILED DESCRIPTION OF THE INVENTION

In accordance with the present invention, there are provided novel compositions comprising:

(a) an ethylene-carbon monoxide copolymer having a melt index in the range of about 0.2 up to 2,000 grams per 10 minutes at 190° C. and a carbon monoxide content, based on the weight of the ethylene-carbon monoxide copolymer component, falling in the range of about 0.2 up to 50 wt %, and (b) in the range of about 0.5 up to 70 wt %, based on the weight of the total composition, of a polysaccharide comprised of linear and branched polymers of alpha-D-glucopyranosyl units, and optionally (c) up to about 10 wt %, based on the weight of the total composition, of at least one triglyceride ester of an unsaturated fatty acid.

In accordance with a particular embodiment of the present invention, there is provided a process for enhancing the photodegradability of ethylene-carbon monoxide copolymer-containing compositions, said process comprising:

blending said ethylene-carbon monoxide copolymer, at a temperature sufficient to maintain said copolymer in the melt, with in the range of 0.5 up to 70 wt % of at least one polysaccharide comprised of linear and branched polymers of alpha-D-glucopyranosyl units; wherein the temperature of said blending is maintained below the temperature at which said polysaccharide undergoes substantial degradation; and wherein said blending is sufficiently thorough so as to achieve a substantially uniform distribution of polysaccharide in the ethylene-carbon monoxide copolymer matrix.

In accordance with yet another embodiment of the present invention, a process is provided whereby biodegradability is imparted to ethylene-carbon monoxide copolymer-containing compositions, said process comprising:

blending said ethylene-carbon monoxide copolymer, at a temperature sufficient to maintain said copolymer in the melt, with in the range of 0.5 up to 70 wt % of at least one polysaccharide comprised of linear and branched polymers of alpha-D-glucopyranosyl units; wherein the temperature of said blending is maintained below the temperature at which said polysaccharide undergoes substantial degradation; and wherein said blending is sufficiently thorough so as to achieve a substantially uniform distribution of polysaccharide in the ethylene-carbon monoxide copolymer matrix.

Ethylene-carbon monoxide copolymers useful in the practice of the present invention are well known in the art. Such copolymers are typically prepared by the peroxide or gamma-ray irradiation initiated copolymerization of ethylene with carbon monoxide. Numerous publications have appeared detailing the synthesis of ethylene-carbon monoxide copolymers. See, for example,, U.S. Pat. Nos. 2,396,963, 2,436,269, 2,441,082, 2,457,271, 2,495,282, 2,495,285, 2,495,286, 2,526,637, 2,566,268, 2,579,033, 2,595,400, 2,599,501, 2,620,325, 2,634,254, 2,682,525 and 2,682,524, each of which is hereby incorporated by reference herein relating to the peroxide initiated polymerization of ethylene and carbon monoxide. See also U.S. Pat. Nos. 3,083,184, 3,530,109, 3,689,460, 3,694,412, 3,835,123, 3,948,873, 3,984,388, 4,024,325, 4,024,326 and 4,143,096, each of which is hereby incorporated by reference herein, relating to more recently developed methods for the preparation of ethylene-carbon monoxide copolymers.

The carbon monoxide content of ethylene-carbon monoxide copolymers contemplated for use in the practice of the present invention can vary widely. Typically, the carbon monoxide content, based on the weight of the ethylene-carbon monoxide copolymer component of the invention composition, will fall within the range of about 0.2 up to 50 wt %. Preferred ethylene-carbon monoxide copolymers contain in the range of about 0.5 up to 20 weight percent carbon monoxide, while ethylene-carbon monoxide copolymers containing in the range of about 0.5 up to 2 weight percent carbon monoxide are presently most preferred because at such CO levels, products having practical lifetimes upon exposure to light are obtained.

Ethylene-carbon monoxide copolymers contemplated for use in the practice of the present invention typically have a melt index in the range of about 0.2 up to 2,000 grams per 10 minutes at 190° C. Preferred ethylene-carbon monoxide copolymers are materials having a melt index in the range of about 0.5 up to 50 grams per 10 minutes at 190° C. The most preferred melt index for the ethylene-carbon monoxide copolymer component depends on the particular application contemplated for the finished article. For example, blown film typically requires a melt index falling in the range of about 1 up to 10 grams per 10 minutes at 190° C. in order to insure adequate melt strength for use during the film-making operation. For a variety of applications, ethylene-carbon monoxide copolymer having a melt index in the range of about 1 up to 20 grams per 10 minutes at 190° C. is presently preferred for use in the practice of the present invention.

Polysaccharides contemplated for use in the practice of the present invention are materials comprised of linear (i.e., amylose) and branched (i.e., amylopectin) polymers of alpha-D-glucopyranosyl units. Such polysaccharide materials can be derived from corn, wheat, rice, tapioca, potato, and other sources. Corn starch is a presently preferred source of such polysaccharide as such material is most economically available. Rice starch has the beneficial property of a smaller average particle size which can be advantageous in the preparation of very thin (less than about 0.5 mil or 0.13 mm) films.

Chemically modified starch materials having increased hydrophobic character are also contemplated for use in the practice of the present invention. Such modified materials include hydroxyethyl or hydroxypropyl starch having a degree of substitution in the range of about 0.05 up to 3, starch esters of $C_2$–$C_{10}$ carboxylic acids or anhydrides (e.g., acetate) or mixed esters having a degree of substitution in the range of about 0.5 up to 3, starch substituted with trialkylsilyl groups of the structure $R_3Si$—, wherein each R is independently a $C_1$ up to $C_5$ alkyl radical; and having up to about 2% by weight silicone, and the like.

Invention environmentally degradable polymer compositions contain broadly in the range of about 0.5 up to 70 wt %, based on the weight of the total composition, of at least one of the above-described polysaccharide compounds. Preferred compositions contemplated for use in the practice of the present invention contain in the range of about 1 up to 20 wt % polysaccharide, based on the weight of the total composition; with quantities in the range of about 3 up to 10 wt % polysaccharide being presently most preferred for the most desirable balance of rate of degradation and strength of the resulting article.

Also optionally included in the invention compositions are triglyceride esters of unsaturated fatty acids. Exemplary materials contemplated for use in the practice of the present invention when this optional component is added to the invention compositions include vegetable oils (e.g., corn oil, olive oil, rapeseed oil, soybean oil, cotton seed oil, sunflower oil, peanut oil, linseed oil), animal oils (e.g., tallow), and the like. Such materials contain a desirable number of carbon-carbon double bonds, so as to render the resulting composition susceptible to chemical degradation. The level of carbon-carbon double bonds present in the unsaturated triglyceride ester is typically measured by iodometric titration, typically reported as iodine numbers. Appropriate iodine numbers for unsaturated triglyceride esters contemplated for use in the practice of the present invention fall in the range of about 10 up to 300 centigrams of iodine per gram of sample, with unsaturated triglyceride esters having iodine numbers in the range of about 100 up to 300 preferred.

When employed, up to about 10 wt % of the unsaturated triglyceride ester can be employed in the practice of the present invention. Preferred levels fall in the range of about 0.25 up to 2 wt %, with quantities in the range of about 0.25 up to 0.5 wt % being presently most preferred because at such levels, little, if any, discoloration is imparted to the finished article, and the occurrence of any oily feed in the finished article is minimized.

Invention composition can be prepared in a variety of ways, as can readily be determined by those of skill in the art. Any method of compounding which provides an even distribution of polysaccharide in the ethylene-carbon monoxide copolymer matrix is suitable. As a typical procedure, the ethylene-carbon monoxide copolymer can be melted and the polysaccharide material added under conditions of shear so as to insure even distribution. The minimum temperature required to melt the ethylene-carbon monoxide copolymer is typically about 110° C. Maximum temperatures employed for the blending operation should not exceed the point at which the polysaccharide material begins to degrade, typically about 170° C. Any type of masticating equipment is suitable for use in the practice of the present invention, such as for example, Banbury mixers, Brabender mixers or extruders, and the like. Presently preferred mixing equipment is an extruder where the operation can be carried out in a continuous fashion, such as a twin-screw extruder where intimate mixing can be achieved, and volatile components can be removed by vacuum. Volatile components such as water can be detrimental to the film properties of the finished composition. Since the polysaccharide component is typically hydrophilic, water removal during processing is most desirable.

The invention will now be described in greater detail by reference to the following non-limiting examples.

EXAMPLES

In the following examples, ASTM Method G21-70 (reapproved in 1985) was used to measure biodegradability. The five fungi specified were pooled and sprayed on duplicates of each sample, pieces of 1/16 inch tensile bar. Nutrient salts, agar containing 1 percent dextrose, served as viability (positive) control. All plates were incubated at 28° C. for three weeks.

To test for photodegradability, tensile samples were exposed according at AATCC (American Association of Textile Chemists and Colorists) test 16-E (see also ASTM Method G-26, Method C) at 30 percent humidity with the light source controlled at 420 nm. One day's exposure was equal to 20 SFU (Standard Fade Units) as determined by a fade of 20 Delta E units on Purple Polyester test fabrics.

The extruder employed for each of the following blending operations was a 25-mm twin-screw extruder with a length-to-diameter ratio of 33:1. The extruder consisted of six heated barrels (5 diameters in length each) and a feed barrel (3 diameters in length). Each barrel was equipped with its own heater and temperature controller, so that the temperature of each individual barrel could be controlled independently. A vacuum port was located at the fifth barrel, through which volatile components were removed. The feed hopper was connected to a volumetric feeder so that material could be fed to the extruder at a controlled rate.

EXAMPLE 1

Preparation of Masterbatch Comprised of Ethylene-Carbon Monoxide (ECO) Copolymer and Modified Starch A masterbatch blend was prepared using the Berstorf ZE 25-mm twin-screw extruder described above. The screw profile was that used for mineral fillers. ECO copolymer (5.1 percent CO, 15 melt index) was added through the feeder. Starch, containing 0.3 percent silicon, was added without predrying to the third port of the extruder using a standard pellet feed system which was agitated with a mechanical stirrer to minimize bridging. Extruder conditions: barrel temperature =180° C.; melt temperature =197° C., melt pressure =210 psi, speed =80 rpm, production rate =10 pounds/hour.

The resulting blend was an opaque white material. It contained 33 percent starch and 4.5 percent water in addition to the ECO copolymer.

EXAMPLE 2

Preparation of Blends Comprised of ECO Copolymer, Modified Starch, and Corn Oil

A series comprised of 19 separate blends was prepared using the Berstorff ZE 25-mm twin-screw extruder described above. Starch/ECO masterbatch was tumble blended with the appropriate ECO copolymer and fed into the throat of the extruder. Corn oil, without added preservatives, was added to a second port using an Ejex pump which has been calibrated volumetrically. Extruder conditions: barrel temperature =175° to 195° C., melt temperature =195° C., melt pressure =110 to 230 psi, extruder speed =80 rpm, output =10 pounds per hour. Screw profile was that used for material fillers. The compositions shown in Table I were prepared.

TABLE I

| | ECO Starch Blends | | |
|---|---|---|---|
| Sample Number | ECO, g | Masterbatch, g | Oil, g |
| 1 | 4446[1] | 105 | 12 |
| 2 | 4446[1] | 105 | 23 |
| 3 | 4446[2] | 105 | 12 |
| 4 | 4446[2] | 105 | 23 |
| 5 | 3496[1] | 1050 | 12 |
| 6 | 3496[1] | 1050 | 23 |
| 7 | 3496[2] | 1050 | 12 |
| 8 | 3496[2] | 1050 | 23 |
| 9 | 3950[3] | 591 | 17 |
| 10 | 3950[4] | 591 | 17 |
| 11 | 3950[5] | 591 | 17 |
| 12 | 4540[1] | 0 | 0 |
| 13 | 4540[1] | 0 | 12 |
| 14 | 4540[4] | 0 | 0 |
| 15 | 4540[4] | 0 | 12 |
| 16 | 3996[1] | 545 | 0 |
| 17 | 3996[1] | 545 | 12 |
| 18 | 3996[4] | 545 | 0 |
| 19 | 3996[4] | 545 | 12 |

[1]CO content of the ECO copolymer was 5.1 wt %; density (g/cc) was 0.938 and melt index was 15.2 g/10 min.
[2]CO content of ECO copolymer was 7.5 wt %; density was 0.948 and melt index was 6.8 g/10 min.
[3]CO content of ECO copolymer was 0; density was 0.973 and melt index was 5.8 g/10 min.
[4]CO content of ECO copolymer was 11.1 wt %; density was 0.959 and melt index was 3.7 g/10 min.
[5]CO content of ECO copolymer was 6.8 wt %; density was 0.944 and melt index was 3.5 g/10 min.

EXAMPLE 3

Compositional Analysis of Starch ECO Blends

A sample (0.2 grams) of blend was accurately weighed and transferred to a Pyrex pressure tube which contained 10 mL xylene, 10 mL of water, and two drops of concentrated hydrochloric acid. The mixture, which was composed of two liquid layers with suspended starch particles, was sealed and heated for four hours at 135° C., using a heating block. At this time the starch was partially hydrolyzed and was water soluble. The tube was cooled to 100° C. in a steam bath. The bottom (aqueous) layer was removed with a pipet and charged to a 50-mL round-bottomed flask for which a tare weight had been obtained. Volatile components were removed on a rotary evaporator by heating to 80° C. at 5 Torr. The contents of the flask were weighed. This was the starch fraction.

The xylene layer was allowed to cool slowly to room temperature to facilitate crystallization. The crystalline material was filtered through filter paper for which a tare weight had been obtained. The crystals were oven dried at 80° C. This was the crystalline fraction. Volatiles were removed from the above filtrate to give the amorphous fraction. The CO content of the crystalline fraction was determined by infrared spectroscopy by measuring the intensity of the CO stretching overtone band at 3,412 cm$^{-1}$ with respect to the sample thickness, as measured by the intensity of band at 2,019 cm$^{-1}$.

EXAMPLE 4

Physical Strength Study

A factorial experiment was designed to study the effects of the following variables: Carbon monoxide concentration, i.e., [CO], in the range of 0.25 to 10 percent; starch concentration, i.e., [starch], in the range of 0 to 11 percent; and oil concentration, i.e., [oil] in the range of 0 to 0.5 percent. Corn oil contained no stabilizers. A masterbatch comprised of approximately 33 percent starch in ECO copolymer was prepared using the 25-mm Berstorff twin-screw extruder described above. The masterbatch was tumble blended with the appropriate ECO copolymer and fed with the appropriate amount of oil to the twin-screw extruder. The blends prepared and their analyses are presented in Table II.

TABLE II

| | ECO STARCH BLENDS | | | | |
|---|---|---|---|---|---|
| Sample No. | Melt Index | Density, g/cc | CO, % & obs | Starch Level, % obs | Oil, % |
| 1 | 18.70 | 0.9411 | 5.5 | 1.3 | 0.25 |
| 2 | 19.80 | 0.9403 | 5.2 | 1.3 | 0.50 |
| 3 | 9.24 | 0.9458 | 8.8 | 1.3 | 0.25 |
| 4 | 8.96 | 0.9442 | 8.6 | 1.4 | 0.50 |
| 5 | 14.30 | 0.9696 | 5.7 | 8.7 | 0.25 |
| 6 | 15.40 | 0.9683 | 5.4 | 11.1 | 0.50 |
| 7 | 9.00 | 0.9783 | 7.6 | 7.9 | 0.25 |
| 8 | 7.58 | 0.9709 | 7.0 | 8.5 | 0.50 |
| 9 | 7.72 | 0.9398 | .25 | 4.2 | 0.38 |
| 10 | 6.92 | 0.9702 | 10.6 | 3.8 | 0.38 |
| 11 | 5.20 | 0.9529 | 6.5 | 3.3 | 0.38 |
| 12 | 16.80 | 0.9378 | 5.0 | .1 | 0.00 |
| 13 | 19.90 | 0.9383 | 5.0 | .7 | 0.25 |
| 14 | 4.54 | 0.9570 | 10.9 | .1 | 0.00 |
| 15 | 6.92 | 0.9568 | 11.2 | .7 | 0.25 |
| 16 | 12.60 | 0.9429 | 5.1 | 4.3 | 0.00 |
| 17 | 17.90 | 0.9489 | 5.4 | 4.5 | 0.25 |
| 18 | 2.86 | 0.9693 | 12.0 | 3.2 | 0.00 |
| 19 | 6.33 | 0.9701 | 10.3 | 4.1 | 0.25 |

The blends were compression molded and 1/16-inch tensile bars were cut. Physical properties were measured and samples were exposed to Weather-Ometer only, fungi only, and both Weather-Ometer and fungi.

Results of tensile testing on Weather-Ometer exposed samples are shown on Table III. Tensile elongation is a physical property which can be used to monitor loss in physical strength of a sample due to exposure. It was observed that elongation decreased as exposure time or [CO] increased.

TABLE III

Tensile Properties of Blends After Weather-Ometer Exposure

| Sample No. | CO, % Observed | Starch, % Observed | Oil, % | Elongation, % | | | |
|---|---|---|---|---|---|---|---|
| | | | | 0 Day | 1 Day | 3 Day | 7 Day |
| 1 | 5.50 | 1.3 | 0.25 | 80 | 45 | 15 | 5 |
| 2 | 5.20 | 1.3 | 0.50 | 80 | 45 | 20 | 5 |
| 3 | 8.80 | 1.3 | 0.25 | 15 | 50 | 15 | 2 |
| 4 | 8.60 | 1.4 | 0.50 | 120 | 45 | 15 | 2 |
| 5 | 5.70 | 8.7 | 0.25 | 60 | 20 | 10 | 5 |
| 6 | 5.40 | 11.1 | 0.50 | 60 | 20 | 10 | 5 |
| 7 | 7.60 | 7.9 | 0.25 | 80 | 25 | 10 | 5 |
| 8 | 7.00 | 8.5 | 0.50 | 85 | 20 | 10 | 5 |
| 9 | 0.25 | 4.2 | 0.38 | 80 | 85 | 80 | 70 |
| 10 | 10.60 | 3.8 | 0.38 | 115 | 30 | 10 | 3 |
| 11 | 6.50 | 3.3 | 0.38 | 80 | 30 | 10 | 3 |
| 12 | 5.10 | 0.0 | 0.00 | 70 | 45 | 20 | 3 |
| 13 | 5.00 | 0.7 | 0.25 | 75 | 50 | 20 | 3 |
| 14 | 11.10 | 0.0 | 0.00 | 85 | 55 | 20 | 2 |
| 15 | 11.20 | 0.7 | 0.25 | 95 | 55 | 20 | 2 |
| 16 | 5.10 | 4.3 | 0.00 | 65 | 25 | 10 | 6 |
| 17 | 5.40 | 4.5 | 0.25 | 70 | 25 | 10 | 5 |
| 18 | 12.00 | 3.2 | 0.00 | 100 | 35 | 10 | 3 |
| 19 | 10.30 | 4.1 | 0.25 | 90 | 30 | 10 | 3 |

After seven days of Weather-Ometer exposure, blends became totally insoluble (gel) in xylene, indicative of crosslinking. Crosslinking resulting from light exposure is a mechanism responsible for embrittlement and loss of physical integrity of the polymer.

The data in Table III demonstrate that as Weather-Ometer exposure increases, sample elongation decreases dramatically. Elongation loss was less intense for the sample with a low [CO], see Sample No. 9. The ECO-containing compositions are all seen to be are photodegradable.

Statistical analysis of the effect of the elongation response after one day exposure, to the variables [CO], [starch], and [oil] indicates that CO and starch have a negative effect on elongation after Weather-Ometer exposure. That is, as [CO] and/or [starch] is increased, elongation is decreased. This negative influence of starch was particularly unexpected.

EXAMPLE 5

Biodegradability Study

Results of fungal testing on samples that have been tested without exposure and samples that had been exposed to seven days in the Weather-Ometer are shown in Table IV.

TABLE IV

Fungal Growth Ratings on Blends

| Sample No. | CO, % Observed | Starch, % Observed | Oil, % | Growth Rating (1) | Growth Rating (2) |
|---|---|---|---|---|---|
| 1 | 5.50 | 1.3 | 0.25 | 1.0 | 2.0 |
| 2 | 5.20 | 1.3 | 0.50 | 1.0 | 2.5 |
| 3 | 8.80 | 1.3 | 0.25 | 1.0 | 1.5 |
| 4 | 8.60 | 1.4 | 0.50 | 2.8 | 2.0 |
| 5 | 5.70 | 8.7 | 0.25 | 1.5 | 1.0 |
| 6 | 5.40 | 11.1 | 0.50 | 2.0 | 2.0 |
| 7 | 7.60 | 7.9 | 0.25 | 1.0 | 1.5 |
| 8 | 7.00 | 8.5 | 0.50 | 1.0 | 2.0 |
| 9 | 0.25 | 4.2 | 0.38 | 1.5 | 2.0 |
| 10 | 10.60 | 3.8 | 0.38 | 1.0 | 2.0 |
| 11 | 6.50 | 3.3 | 0.38 | 1.0 | 2.0 |
| 12 | 5.10 | 0.0 | 0.00 | 0.0 | 1.0 |
| 13 | 5.00 | 0.7 | 0.25 | 1.0 | 1.0 |
| 14 | 11.10 | 0.0 | 0.00 | 0.0 | 2.5 |
| 15 | 11.20 | 0.7 | 0.25 | 2.0 | 2.0 |
| 16 | 5.10 | 4.3 | 0.00 | 1.0 | 2.0 |
| 17 | 5.40 | 4.5 | 0.25 | 1.0 | 2.0 |
| 18 | 12.00 | 3.2 | 0.00 | 0.0 | 2.5 |
| 19 | 10.30 | 4.1 | 0.25 | 2.0 | 3.0 |

(1) Average (two determinations) rating after 21 days exposure to fungi.
(2) Average (two determinations) after 7 days exposure in Weather-Ometer followed by 21 days exposure to fungi.

| Observed Growth on Specimens | Rating |
|---|---|
| None | 0 |
| Traces of growth (less than 10%) | 1 |
| Light growth (10 to 30%) | 2 |
| Medium growth (30 to 60%) | 3 |
| Heavy growth (60% to complete coverage) | 4 |

An increase in growth rating was observed in nearly every case. In some cases, i.e., Sample No. 18, the increase is dramatic. Thus prior light exposure resulted in increased biodegradability.

Statistical analysis for the response of fungal growth rating (without Weather-Ometer exposure) to the variables [CO], [starch], and [oil] indicates that highest growth ratings are predicted at high levels of starch and low CO levels.

Oil has very little effect, but this is expected due to lack of metals in the growth medium. Metal salts of oil are typically necessary for autoxidation to occur.

Tensile properties of fungal-exposed specimens were unchanged from control samples. Since microbial action is probably initially confined to the surface, physical properties would not be expected to suffer significantly after only 21 days exposure.

Growth ratings were higher for samples that had been previously exposed to Weather-Ometer for seven days. Apparently light exposure has a dramatic effect on the degradability of the invention compositions.

EXAMPLE 6

Other Analyses

A selected series of the blends was submitted for scanning electron microscopy (SEM). Relatively large starch particles were present, on the order of about 10 microns. The specimens exposed to fungi only showed jagged edges on the starch particles. The specimen exposed to Weather-Ometer testing showed voids. It appeared that the smaller starch particles were somehow removed. The specimen that was exposed to both Weather-Ometer and fungi showed both effects: small starch particles were missing, and the large starch particles had jagged edges indicting attack.

Gel permeation chromatography (GPC) was used to measure sample molecular weight distributions for Sample No. 19. Results are presented in Table VI.

TABLE VI

Gel Permeation Chromatography of Variously Treated Specimens of Sample No. 29

| Sample Exposure | Mw | Mn | Mw/Mn |
|---|---|---|---|
| None | 137925 | 15223 | 9.1 |
| Fungal | 143644 | 15097 | 9.5 |
| Weather-Ometer | 140415 | 14040 | 10.0 |

A selective loss of lower molecular weight species was observed in samples that were exposed to fungi. Apparently the low molecular weight species are assimilated by the fungi. After one day Weather-Ometer exposure a decrease in lower molecular weight species was observed (i.e., Mw/Mn increased).

The invention has been described in detail with particular reference to preferred embodiments thereof, but it will be understood that variations and modifications can be effected within the spirit and scope of the invention.

We claim:

1. A composition comprising:
   (a) an ethylene-carbon monoxide copolymer having a melt index in the range of about 0.2 up to 2,000 grams per 10 minutes at 190° C. and a carbon monoxide content, based on the weight of the ethylene-carbon monoxide copolymer component, falling in the range of about 0.2 up to 50 wt %, and
   (b) in the range of about 0.5 up to 70 wt %, based on the weight of the total composition, of a polysaccharide comprised of linear and branched polymers of alpha-D-glucopyranosyl units, and optionally
   (c) up to about 10 wt %, based on the weight of the total composition of at least one triglyceride ester of an unsaturated fatty acid.

2. A composition in accordance with claim 1 wherein said ethylene-carbon monoxide copolymer component has a melt index in the range of about 0.5 up to 50 grams per 10 minutes at 190° C.

3. A composition in accordance with claim 1 wherein said ethylene-carbon monoxide copolymer component has a melt index in the range of about 1 up to 20 grams per 10 minutes at 190° C.

4. A composition in accordance with claim 1 wherein the carbon monoxide content of said ethylene-carbon monoxide copolymer component falls in the range of about 0.5 up to 20 wt %.

5. A composition in accordance with claim 1 wherein the carbon monoxide content of said ethylene-carbon monoxide copolymer component falls in the range of about 0.5 up to 2 wt %.

6. A composition in accordance with claim 1 wherein said polysaccharide comprised of linear and branched polymers of alpha-D-glucopyranosyl units is selected from:
   corn starch,
   wheat starch,
   rice starch,
   hydroxyethyl or hydroxypropyl starches having a degree of substitution in the range of about 0.5 up to 3,
   starch esters or mixed esters of $C_2$–$C_{10}$ carboxylic acids or anhydrides having a degree of substitution in the range of about 0.5 up to 3, or
   starches substituted with trialkylsilyl groups of the structure $R_3Si-$, wherein each R is independently a $C^1$ up to $C_5$ alkyl radical, and having up to 2 wt % silicone.

7. A composition in accordance with claim 1 wherein said polysaccharide comprised of linear and branched polymers of alpha-D-glucopyranosyl units is present in an amount falling in the range of about 1 up to 20 wt %, based on the weight of the total composition.

8. A composition in accordance with claim 1 wherein said polysaccharide comprised of linear and branched polymers of alpha-D-glucopyranosyl units is present in an amount falling in the range of about 3 up to 10 wt %, based on a weight of the total composition.

9. A composition in accordance with claim 1 wherein said at least one triglyceride ester of an unsaturated fatty acid has an iodine value in the range of about 10 up to 300 centigrams iodine per gram of sample.

10. A composition in accordance with claim 1 wherein said at least one triglyceride ester of an unsaturated fatty acid is selected from corn oil, olive oil, rapeseed oil, soybean oil, cottonseed oil, sunflower oil, peanut oil, linseed oil, tallow oil, others.

11. A composition in accordance with claim 1 wherein said at least one triglyceride ester of an unsaturated fatty acid is present in an amount falling in the range of about 0.25 up to 2 wt %, based on the weight of the total composition.

12. A composition in accordance with claim 1 wherein said at least one triglyceride ester of an unsaturated fatty acid is present in an amount falling in the range of about 0.25 up to 0.5 wt %, based on the weight of the total composition.

13. A process for enhancing the environmental degradability of ethylene-carbon monoxide copolymer-containing compositions, said process comprising:
   blending said ethylene-carbon monoxide copolymer, at a temperature sufficient to maintain said copolymer in the melt, with in the range of 0.5 up to 70 wt % of at least one polysaccharide comprised of linear and branched polymers of alpha-D-glucopyranosyl units; wherein the temperature of said blending is maintained below the temperature at which said polysaccharide undergoes substantial degradation; and wherein said blending is sufficiently thorough so as to achieve a substantially uniform distribution of polysaccharide in the ethylene-carbon monoxide copolymer matrix.

14. A process in accordance with claim 13 wherein said ethylene-carbon monoxide copolymer has a melt index in the range of about 0.2 up to 2,000 grams per 10 minutes at 190° C. and a carbon monoxide content, based on the weight of the ethylene-carbon monoxide copolymer component, falling in the range of about 0.2 up to 50 wt %.

15. A process in accordance with claim 13 wherein said ethylene-carbon monoxide copolymer has a melt index in the range of about 0.5 up to 50 grams per 10 minutes at 190° C.

16. A process in accordance with claim 13 wherein said ethylene-carbon monoxide copolymer has a melt index in the range of about 1 up to 20 grams per 10 minutes at 190° C.

17. A process in accordance with claim 13 wherein the carbon monoxide content of said ethylene-carbon monoxide copolymer falls in the range of about 0.5 up to 20 wt %.

18. A process in accordance with claim 13 wherein the carbon monoxide content of said ethylene-carbon monoxide copolymer falls in the range of about 0.5 up to 2 wt %.

19. A process in accordance with claim 13 wherein said polysaccharide comprised of linear and branched polymers of alpha-D-glucopyranosyl units is selected from:
   corn starch,
   wheat starch,
   rice starch, hydroxyethyl or hydroxypropyl starches having a degree of substitution in the range of about 0.5 up to 3, starch esters or mixed esters of $C_2$–$C_{10}$ carboxylic acids or anhydrides having a degree of substitution in the range of about 0.5 up to 3, or starches substituted with trialkylsilyl groups of the structure $R_3Si-$, wherein each R is independently a $C^1$ up to $C_5$ alkyl radical, and having up to 2 wt % silicone.

20. A process in accordance with claim 13 wherein said polysaccharide comprised of linear and branched polymers of alpha-D-glucopyranosyl units is present in an amount falling in the range of about 1 up to 0 wt %, based on the weight of the total composition.

21. A process in accordance with claim 13 wherein said polysaccharide comprised of linear and branched polymers of alpha-D-glucopyranosyl units is present in an amount falling in the range of about 3 up to 10 wt %, based on the weight of the total composition.

22. A process in accordance with claim 13 wherein said blending is accomplished employing a twin screw extruder.

23. A process in accordance with claim 13 wherein said blending is accomplished employing a two roll mill.

24. A process in accordance with claim 13 wherein up to 10 wt % of at least one triglyceride ester of an unsaturated fatty acid is added to said blending operation.

* * * * *

UNITED STATES PATENT AND TRADEMARK OFFICE
CERTIFICATE OF CORRECTION

PATENT NO. : 5,070,122

DATED : December 3, 1991

INVENTOR(S) : Jeffrey J. Vanderbilt, Charles M. Neeley

It is certified that error appears in the above-identified patent and that said Letters Patent is hereby corrected as shown below:

Column 11, line 14, Claim 20 "0" should read --- 20 ---

Signed and Sealed this

Ninth Day of March, 1993

*Attest:*

STEPHEN G. KUNIN

*Attesting Officer*     *Acting Commissioner of Patents and Trademarks*